(12) United States Patent
Tashiro et al.

(10) Patent No.: US 9,790,949 B2
(45) Date of Patent: Oct. 17, 2017

(54) VARIABLE DISPLACEMENT TURBOCHARGER AND ASSEMBLY METHOD OF VARIABLE NOZZLE MECHANISM

(75) Inventors: Naoto Tashiro, Tokyo (JP); Yasuaki Jinnai, Tokyo (JP); Hiroyuki Arimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 612 days.

(21) Appl. No.: 14/232,563

(22) PCT Filed: Sep. 7, 2012

(86) PCT No.: PCT/JP2012/072888
§ 371 (c)(1),
(2), (4) Date: Feb. 10, 2014

(87) PCT Pub. No.: WO2013/047154
PCT Pub. Date: Apr. 4, 2013

(65) Prior Publication Data
US 2014/0161595 A1    Jun. 12, 2014

(30) Foreign Application Priority Data
Sep. 28, 2011 (JP) ................................ 2011-213558

(51) Int. Cl.
*F04D 27/00* (2006.01)
*F02B 37/24* (2006.01)
*F01D 17/16* (2006.01)

(52) U.S. Cl.
CPC ......... *F04D 27/002* (2013.01); *F01D 17/165* (2013.01); *F02B 37/24* (2013.01);
(Continued)

(58) Field of Classification Search
CPC ........ F01D 17/14; F01D 17/143; F01D 17/16; F01D 17/165; F01D 17/167; F05D 2250/90; F05D 2220/40; F02C 6/12; F02B 37/24
See application file for complete search history.

(56) References Cited

U.S. PATENT DOCUMENTS 4,741,666 A * 5/1988 Shimizu ................ F01D 17/165
                                                         415/158
7,364,401 B2 * 4/2008 Nakagawa ............ F01D 17/165
                                                         415/164
(Continued)

FOREIGN PATENT DOCUMENTS

CN      101035973 A      9/2007
CN      101668933 A      3/2010
(Continued)

OTHER PUBLICATIONS

Chinese Office Action and Search Report for Chinese Application No. 201280035925.9, dated Jul. 24, 2015, with an English translation.
(Continued)

*Primary Examiner* — Gregory Anderson
*Assistant Examiner* — Julian Getachew
(74) *Attorney, Agent, or Firm* — Birch, Stewart, Kolasch & Birch, LLP (57) ABSTRACT

It is provided with: a variable nozzle mechanism for regulating a flow of exhaust gas to a turbine rotor; a link mechanism for converting reciprocal displacement from an actuator that operates a variable nozzle mechanism into rotational displacement and transmitting the rotational displacement to an inner section of a bearing housing; and an engaging part for engaging an output section of the link mechanism and an input section of the variable nozzle mechanism, and the engaging part is constituted by a pin and
(Continued)

a pin insertion slot where the pin is inserted, and a smooth surface is formed around an insertion position of the pin so as to guide a tip of the pin to the insertion position.

4 Claims, 6 Drawing Sheets

(52) U.S. Cl.
CPC ...... *F05D 2220/40* (2013.01); *F05D 2250/27* (2013.01); *F05D 2250/292* (2013.01); *F05D 2250/293* (2013.01); *F05D 2250/711* (2013.01); *Y02T 10/144* (2013.01); *Y10T 29/49236* (2015.01)

(56) References Cited

U.S. PATENT DOCUMENTS

| | | | |
|---|---|---|---|
| 7,463,969 B2 * | 12/2008 | Yamaguchi | F02B 37/12 60/602 |
| 2008/0035112 A1 | 2/2008 | Yamaguchi et al. | |
| 2010/0124489 A1 | 5/2010 | Suzuki et al. | |

FOREIGN PATENT DOCUMENTS

| | | |
|---|---|---|
| JP | 2000-27654 A | 1/2000 |
| JP | 2002-4870 A | 1/2002 |
| JP | 2004-270472 A | 9/2004 |
| JP | 2006-105017 A | 4/2006 |
| JP | 2006-207526 A | 8/2006 |
| JP | 2006-220092 A | 8/2006 |
| JP | 2008-215083 A | 9/2008 |
| JP | 2009-150363 A | 7/2009 |
| JP | 2009-174363 A | 8/2009 |
| JP | 2010-180864 A | 8/2010 |
| JP | 2010-203239 A | 9/2010 |
| JP | 2010-216281 A | 9/2010 |
| JP | 4545068 B2 | 9/2010 |
| JP | 4741709 B1 | 8/2011 |

OTHER PUBLICATIONS

Extended European Search Report, dated May 6, 2015, for European Application No. 12837441.0.

International Preliminary Report on Patentability for PCT/JP2012/072888 dated Apr. 10, 2014 with an English translation.

International Search Report for PCT/JP2012/072888 dated Sep. 7, 2012.

Japanese Notice of Allowance for related Application No. JP2011-213558 dated Oct. 4, 2012 with an English translation.

* cited by examiner

Related Art

FIG.10

Related Art

VARIABLE DISPLACEMENT TURBOCHARGER AND ASSEMBLY METHOD OF VARIABLE NOZZLE MECHANISM

TECHNICAL FIELD

The present invention relates to a variable displacement turbocharger equipped with a variable nozzle mechanism which is configured to vary a vane angle of a plurality of nozzle vanes, and in particular to a structure for assembling a variable nozzle mechanism assembly to a housing including a bearing housing as well as an assembly method of the variable nozzle mechanism.

BACKGROUND ART

For relatively small exhaust turbochargers for use in an internal combustion engine for vehicles, etc., adopted is the configuration in which exhaust gas from the engine fills a scroll formed in a turbine housing, and passes through a plurality of nozzle vanes provided on an inner peripheral side of the scroll to act on a turbine rotor provided on an inner peripheral side of the plurality of nozzle vanes.

Further, a variable displacement turbocharger equipped with a variable nozzle mechanism which is configured to vary an angle of a plurality of nozzle vanes is often used. Examples of this are described in Patent Document 1 and Patent Document 2, for instance.

In this type of variable displacement turbocharger equipped with the variable nozzle mechanism, the variable nozzle mechanism is assembled and then the nozzle mechanism assembly is assembled to the bearing housing or the turbine housing.

When assembling the nozzle mechanism to the bearing, it is necessary to connect a drive ring constituting the variable nozzle mechanism to a link mechanism for converting a drive force of reciprocal displacement from an actuator provided outside the turbine housing or the bearing housing into rotational displacement.

Figure 9:
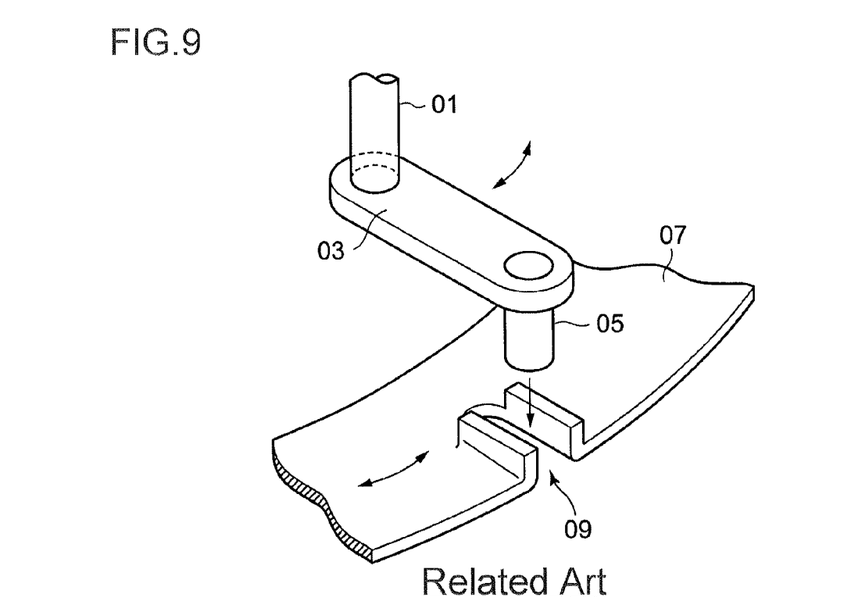
FIG. 9 is an explanatory view of related art.

A connection part is configured, as illustrated in FIG. 9, such that a support shaft 01 of the link mechanism penetrating a wall part of the bearing housing to be supported, a lever 03 provided at a tip portion of the support shaft 01 on the housing inner section side, a connection pin 05 provided at an end of the lever 03 and projecting in a direction perpendicular to the lever 03. This connection pin 05 is fittingly inserted in an engagement protrusion 09 formed by cutting and raising a side surface of a drive ring 07 toward the connection pin 05 side to be fitted therein, the drive ring 07 constituting the variable mechanism 06, so as to assemble the variable nozzle mechanism assembly to the bearing housing. As a result, the drive force of reciprocal displacement from the actuator is converted into the rotational drive force of the support shaft 01 by the link mechanism to rotate the whole drive ring 07 through engagement between the connection pin 05 and the engagement protrusion 09.

Figure 10:
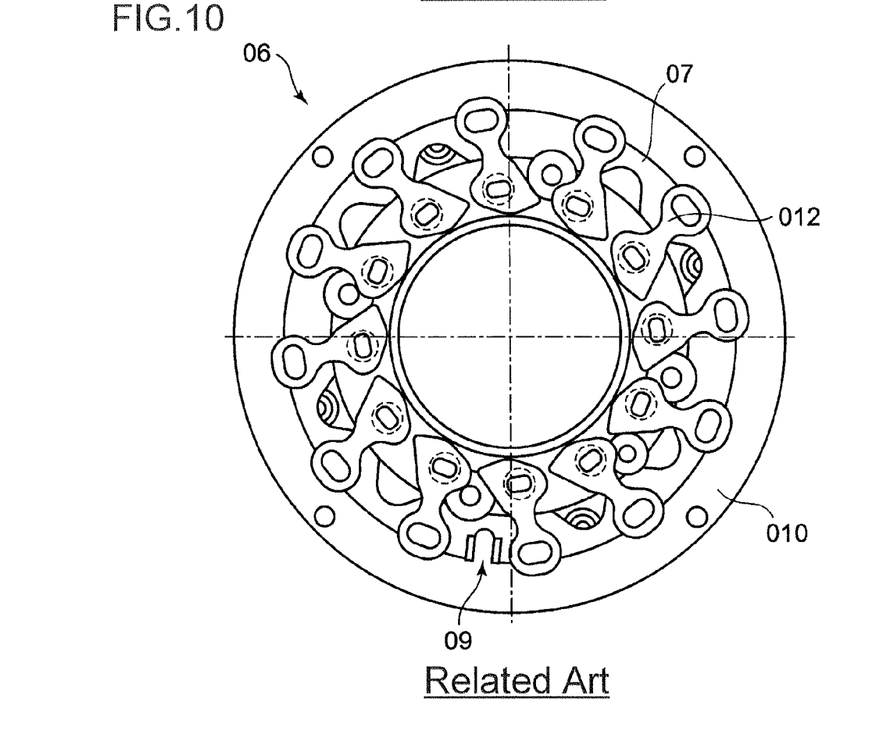
FIG. 10 is an explanatory view of related art.

A front view of this variable nozzle mechanism 06 is illustrated in FIG. 10. The engagement protrusion 09 where the connection pin 05 is inserted is formed in an outer peripheral side of the side surface of the drive ring 07. The variable nozzle mechanism 06 is configured such that a nozzle mount 010, a lever plate 012, the drive ring 07, etc. are assembled together to form the variable nozzle mechanism assembly.

This type of structure where the variable nozzle mechanism is assembled to the housing by engaging the pin part on the lever side with a engagement recess or hole on the drive ring side is described in Patent Document 1 (JP 2008-215083 A) and Patent Document 2 (JP 2009-150363 A).

Described in FIG. 1 and the like of Patent Document 1 is the configuration where reciprocal displacement from an actuator is transmitted to a drive ring 3 via a link 15 and a pin 14.

Further, described in FIG. 7 and the like of Patent Document 2 is the configuration wherein a link 15 is connected to an actuator providing a drive power for nozzle vanes 2, a crank pin 10s is connected to the link 15, and the crank pin 10s engages with a drive ring 3 to rotate the drive ring 3.

CITATION DOCUMENT

Patent Document

[Patent Document 1]
JP 2008-215083 A
[Patent Document 2]
JP 2009-150363 A

SUMMARY

Technical Problem

As illustrated in FIG. 9, in the process of fitting the connection pin 05 provided at the end of the lever 03 in a projecting manner into the engagement protrusion 09 on the drive ring 07 side, as the engagement protrusion 09 is formed into a cut and erected shape, it takes time to insert a tip portion of the connection pin 05 in between the engagement portions 09 disposed at both sides as illustrated in FIG. 9. Specifically, as both of the members are protruding members, it deteriorates efficiency of the assembling process.

Particularly, in the case where the connection pin 05 or the engagement protrusion 09 is located in a rear of the inner section of the bearing housing, the turbine housing or the like, visibility is poor and it further deteriorates assembly workability. Further, if the variable nozzle mechanism is assembled to the housing without achieving suitable engagement, there is a possibility that it fails to exhibit sufficient performance due to assembly defect.

Also in Patent Documents 1 and 2, it is necessary as in the foregoing description of FIG. 9, to insert and engage the crank pin in the engagement slot or between a pair of engagement protrusions of the drive ring. However, neither of the documents discloses a structure considering the ease of fitting. Further, in the case where the insertion position is located in the inner section of the bearing housing, the turbine housing or the like where visibility is poor, there is a problem that it leads to deterioration in workability.

Accordingly, the present invention has been made in view of the above problems, and it is an object to achieve easy and reliable coupling operation of a variable nozzle mechanism with a link mechanism for transmitting a drive from an external actuator when the variable nozzle mechanism assembly is formed and the variable nozzle mechanism assembly is assembled to a housing such as a bearing housing.

Solution to Problem

To achieve the above object, the present invention provides a variable displacement turbocharger comprising:

a turbine housing into which exhaust gas from an internal combustion engine is introduced:

a turbine rotor which is provided in the turbine housing and is configured to be rotated by the exhaust gas;

a turbine shaft whose one end is inserted in the turbine housing, to said end the turbine rotor being attached;

a bearing which is configured to support the turbine shaft;

a bearing housing which houses the bearing and is formed with a cylindrical wall part protruding in an axial direction from an outer peripheral part;

a variable nozzle mechanism which is assembled inside the cylindrical wall part of the bearing housing and is configured to regulate a flow of the exhaust gas to the turbine rotor;

a link mechanism which is configured to convert reciprocal displacement from an actuator that operates the variable nozzle mechanism into rotational displacement and transmit the rotational displacement to an inner section of the bearing housing; and an engaging part which is configured to engage an output section of the link mechanism and an input section of the variable nozzle mechanism, wherein the engaging part is constituted by a pin insertion part which comprises a pin and a pin insertion hole or a pin insertion slot into which the pin is inserted, and a smooth surface is formed around an insertion position of the pin so as to guide a tip of the pin to the insertion position.

According to this aspect of the present invention, the engaging part for engaging the output section of the link mechanism and the input section of the variable nozzle mechanism is constituted by the pin insertion part which comprises a pin and a pin insertion hole or a pin insertion slot into which the pin is inserted, and the smooth surface is formed around the insertion position of the pin so as to guide the tip of the pin to the insertion position. Therefore, when assembling and fixing the variable nozzle mechanism for adjusting the flow of exhaust gas to the turbine rotor to an inside of the cylindrical wall part of the bearing housing, positioning of the pin and the insertion position for the pin is facilitated.

Especially, with the engaging part disposed inside the cylindrical wall part of the bearing housing, it is possible to reliably and easily perform the assembly even under poor visibility of the insertion position and the tip of the pin because of the shadow of the cylindrical wall part. As a result, there hardly occurs assembly defect and the quality stability of the variable displacement turbocharger is improved.

It is preferable in the present invention that the pin projects from a side surface of the drive ring on an outer peripheral side of the drive ring constituting the variable nozzle mechanism, and the pin insertion part comprises a two-fork portion formed at an end of an output lever constituting the link mechanism and the insertion slot formed on an inner side of the two-fork portion, a side face of the two-fork portion forming the smooth surface.

With this configuration, when assembling the variable nozzle mechanism to the inside of the cylindrical wall part of the bearing housing, the tip of the pin projecting from the side surface on the outer peripheral side of the drive ring constituting the variable nozzle mechanism is placed against the smooth surface formed on the side surface of the two-fork portion, and then the pin is moved along the smooth surface to the insertion position. This facilitates positioning of the pin and the insertion position.

It is also preferable in the present invention that the pin projects from an end of an output lever constituting the link mechanism, and the pin insertion part comprises a slot or a hole formed in a side face of the drive ring on an outer peripheral side of the drive ring constituting the variable nozzle mechanism, the side face of the drive ring forming the smooth surface around the slot or the hole.

With this configuration, when assembling the variable nozzle mechanism to the inside of the cylindrical wall part of the bearing housing, the tip of the pin projecting from the end of the output lever constituting the link mechanism is placed against the smooth surface formed around the slot or hole on the side surface of the outer peripheral side of the drive ring constituting the variable nozzle mechanism, and then the pin is moved along the smooth surface to the insertion position. This facilitates positioning of the pin and the insertion position.

It is also preferable in the present invention that a peripheral edge portion of the pin insertion hole or the pin insertion slot of the pin insertion part is rounded to facilitate insertion of the pin.

As the peripheral edge portion of the pin insertion hole or the pin insertion slot is rounded, the pin can be easily inserted in the insertion hole or the insertion slot and also the pin can be inserted reliably and easily when pushing the pin into the insertion hole by sliding the tip portion of the pin on the smooth surface to find the insertion position.

The present invention provides an assemble method for assembling the above-described variable nozzle mechanism to the bearing housing, the method the steps of:

preparing the bearing housing to which the link mechanism is assembled; and assembling the variable nozzle mechanism to the bearing housing, wherein the assembling step comprises the substeps of: placing the pin of the engaging part against the smooth surface; moving a tip portion of the pin along the smooth surface so as to position the tip portion in the insertion position; and then pushing the variable nozzle mechanism toward the bearing housing.

According to this aspect of the present invention, the bearing housing to which the link mechanism is assembled is prepared first, and the variable nozzle mechanism is then assembled to the bearing housing. In the assembling step, the pin of the engaging part is placed against the smooth surface, a tip portion of the pin is moved along the smooth surface so as to position the tip portion in the insertion position, and then the variable nozzle mechanism is pushed toward the bearing housing. Therefore, the positioning of the pin and the insertion position for the pin is facilitated.

Especially, as the engaging part is disposed inside the cylindrical wall part of the bearing housing, it is possible to reliably and easily perform the assembly even under poor visibility of the insertion position and the tip of the pin due to the shadow of the cylindrical wall part.

Advantageous Effects

According to the present invention, the engaging part for engaging the output section of the link mechanism and the input section of the variable nozzle mechanism is constituted by the pin insertion part which comprises a pin and a pin insertion hole or a pin insertion slot into which the pin is inserted, and the smooth surface is formed around the insertion position of the pin so as to guide the tip of the pin to the insertion position. Therefore, when assembling and fixing the variable nozzle mechanism for adjusting the flow of exhaust gas to the turbine rotor to an inside of the cylindrical wall part of the bearing housing, positioning of the pin and the insertion position for the pin is facilitated.

Especially, as the engaging part is disposed inside the cylindrical wall part of the bearing housing, it is possible to reliably and easily perform the assembly even under poor visibility of the insertion position and the tip of the pin because of the shadow of the cylindrical wall part.

DETAILED DESCRIPTION

Embodiments of the present invention will now be described in detail with reference to the accompanying drawings.

It is intended, however, that unless particularly specified, dimensions, materials, shapes, relative positions and the like of components described in the embodiments shall be interpreted as illustrative only and not limitative of the scope of the present invention.
(First Embodiment)

A first embodiment of the present invention is described with reference to FIG. 1 through FIG. 7.

Figure 1:
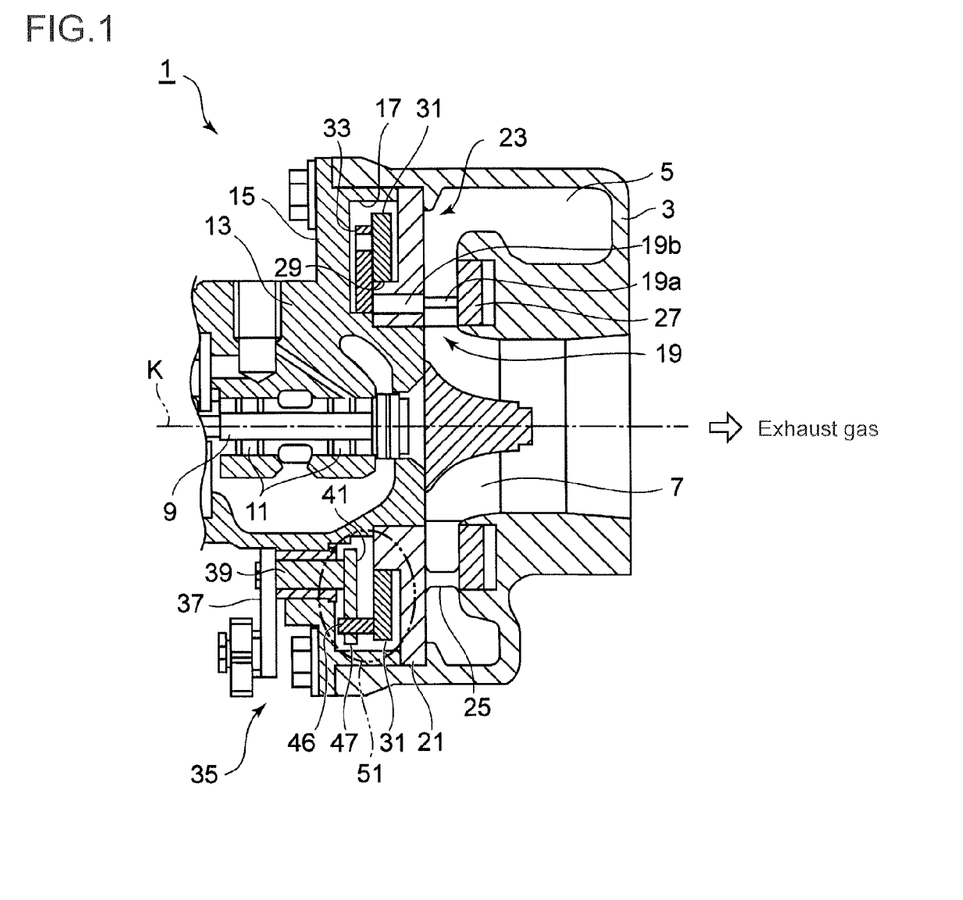
FIG. 1 is a cross-sectional view of a main part of a variable displacement turbocharger illustrating a first embodiment of the present invention.

FIG. 1 is a partial cross-sectional view taken along a rotation axis, illustrating one example of an exhaust turbocharger with a variable nozzle mechanism (a variable displacement turbocharger).

As illustrated in FIG. 1, a turbine housing 3 of a thick-walled tubular shape is provided in an exhaust turbocharger 1, and a scroll 5 of a spiral shape is formed in an outer peripheral part on an upstream side of a turbine housing 3. Meanwhile, in an inner peripheral part on the upstream side of the turbine housing 3, a turbine rotor 7 of a radial flow type is provided.

A turbine shaft 9 to which the turbine rotor 7 is attached has a rotation center which coincides with a rotation axis K in the drawing. The turbine shaft 9 is coaxial with a compressor (not shown). Further, the turbine shaft 9 is rotatably supported by a bearing housing 13 via a bearing 11.

An annular recess (a cylindrical wall part) 17 is formed on a rear surface 15 of the bearing housing 13. In this recess 17, a variable nozzle mechanism section (a variable nozzle mechanism) 23 is accommodated. The variable nozzle mechanism section 23 is a nozzle assembly which comprises a nozzle 19, a nozzle mount 21 and the like.

A plurality of nozzles 19 is provided at equal intervals around the rotation axis K. Further, the nozzle 19 is positioned on an inner peripheral side of the scroll 5 in the radial direction of the turbine.

In addition, the nozzle 19 includes a nozzle vane 19a and a nozzle shaft 19b. The nozzle shaft 19b is rotatably supported by a nozzle mount 21 fixed to the bearing housing 13. Around the rotation axis K, a plurality of supports for a plurality of the nozzle shafts 19b is provided at equal intervals. By this variable nozzle mechanism section 23, it is possible to vary the vane angle of the nozzle vanes 19a.

The nozzle vane 19 is disposed between the nozzle mount 21 and an annular nozzle plate 27. The annular nozzle plate 27 is connected to the nozzle mount 21 such that the nozzle plate 27 and the nozzle plate 21 face each other with a distance therebetween. The distance is provided in the axial direction of the turbine by nozzle supports 25. The nozzle plate 27 is fitted to a distal end side of an inner cylinder of the turbine housing 3.

Figure 2A:
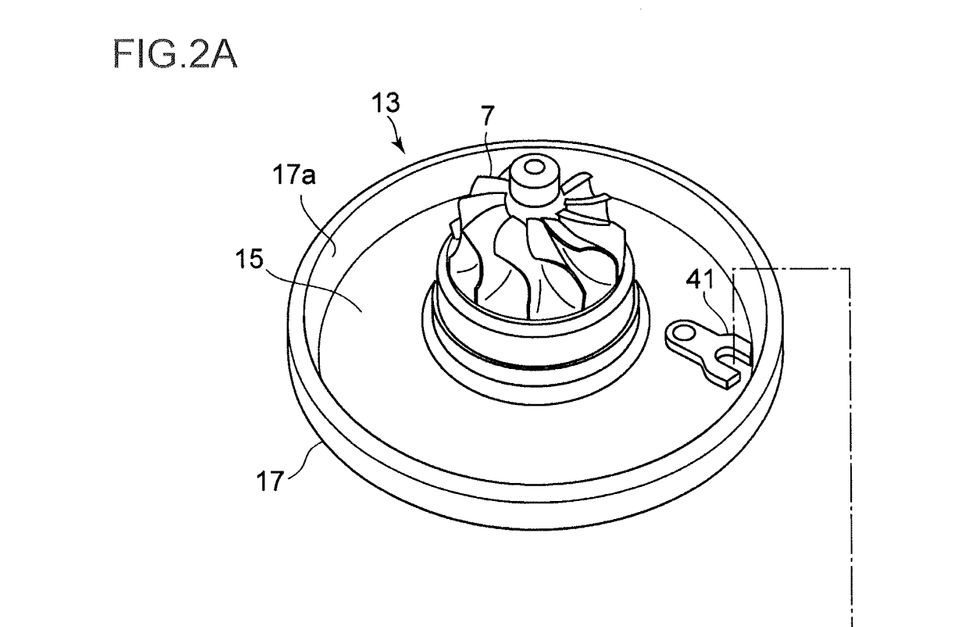
FIG. 2A is an explanatory diagram for explaining an assembling state of a link mechanism section and a variable nozzle mechanism of the first embodiment and illustrates the link mechanism section.
Figure 2B:
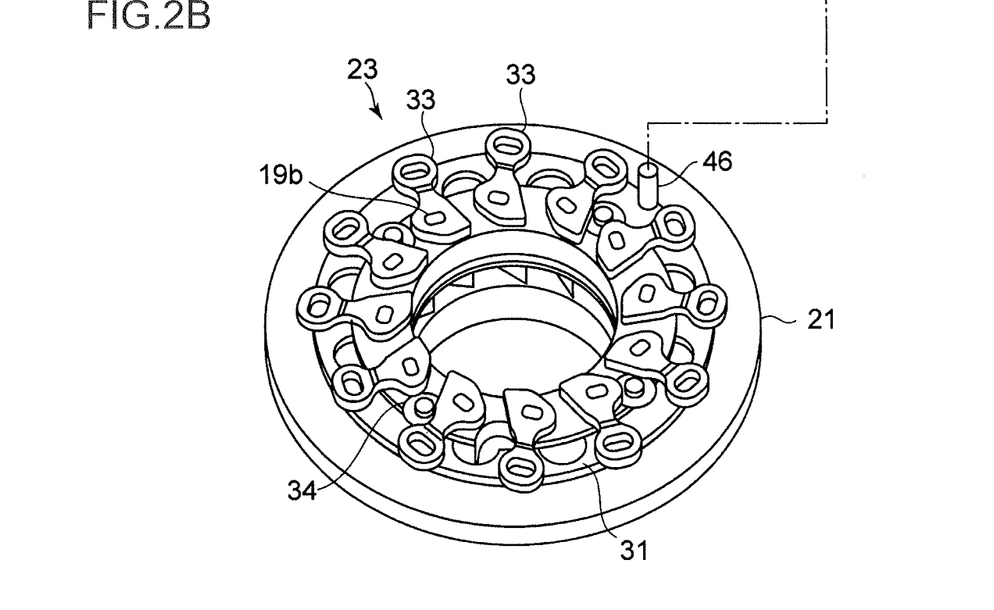
FIG. 2B is an explanatory diagram for explaining an assembling state of the link mechanism section and the variable nozzle mechanism of the first embodiment and illustrates the variable mechanism section.

A stepped portion 29 is provided in the radial direction on the nozzle mount 21. A drive ring 31 of a disc shape is fitted to this stepped portion 29 concentrically with the rotation axis K to be rotatable. On the drive ring 31, a plurality of gourd-shaped lever plates 33 is arranged in the circumferential direction and engages with the drive ring 31 as illustrated in FIG. 2B. One end of this lever plate 33 is attached to the drive ring 31 and other end of this lever plate 33 is connected to an end of the nozzle shaft 19b. The nozzle shaft 19b penetrates an inner section of the nozzle mount 21 in the direction coinciding with the rotation axis K.

In accordance with the rotation angle of the drive ring 31 which rotates around the rotation axis K, the nozzle shaft 19b rotates, thereby rotating the nozzle vane 19a in accordance with the angle. Specifically, an opening degree of the nozzle 19 can be adjusted by rotating the drive ring 31. Herein, twelve nozzle vanes 19a are arranged in the circumferential direction, and corresponding to these twelve nozzle vanes 19a, twelve lever plates 33 are arranged around the rotation axis K.

A rivet 34 (see FIG. 2B) is disposed slightly lower (nearer to the center) than the stepped portion 29 of the nozzle mount 21 on which the drive ring 31 is provided. This rivet 34 is configured to retain the drive ring 31 by a flange head of the rivet 34 so that the drive ring 31 does not come off from the stepped portion 29.

The nozzles 19 (19a, 19b), the nozzle mount 21, the nozzle plate 27, the drive ring 31 and the lever plates 33 that are described above are assembled to constitute the variable nozzle mechanism section 23. Further, on rear surface 15 of the bearing housing 13, the annular recess 17 is formed. In this recess 17, the link mechanism section (the link mechanism) 35 is provided through the rear surface 15.

This link mechanism 35 is configured to convert reciprocal displacement from an actuator (not shown) for operating the variable nozzle mechanism 23 into rotational displacement so as to transmit rotational force to the variable nozzle mechanism 23 which is assembled to an inner section of the bearing housing 13.

The link mechanism section 35 is constituted by an input lever 37 coupled to one end of the actuator, a coupling lever 39 connected to the other end of the input lever and disposed through the wall of the bearing housing 13, and an output lever 41 connected to the coupling lever 39 at one end.

Figure 4:
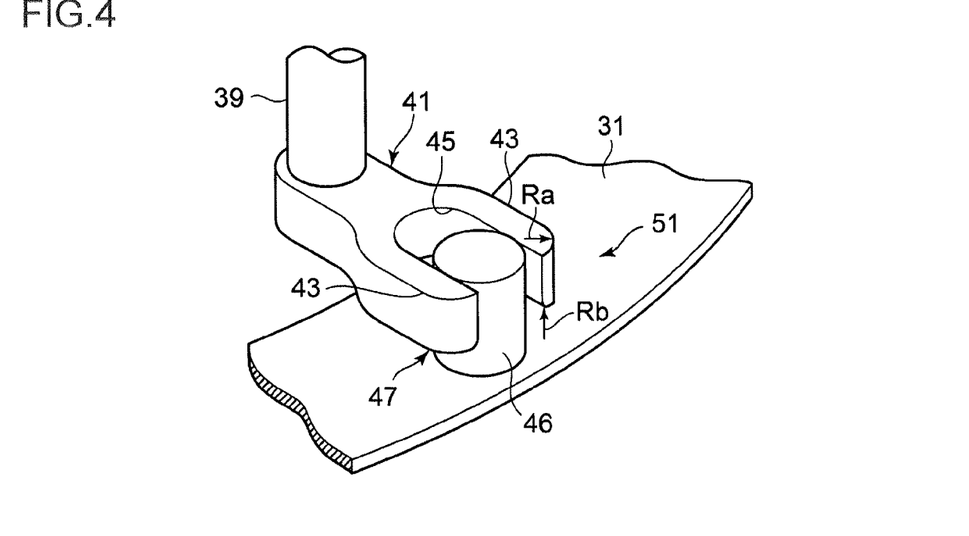
FIG. 4 is an explanatory view illustrating engagement of the link mechanism section and the variable nozzle mechanism section according to the first embodiment.
Figure 5:
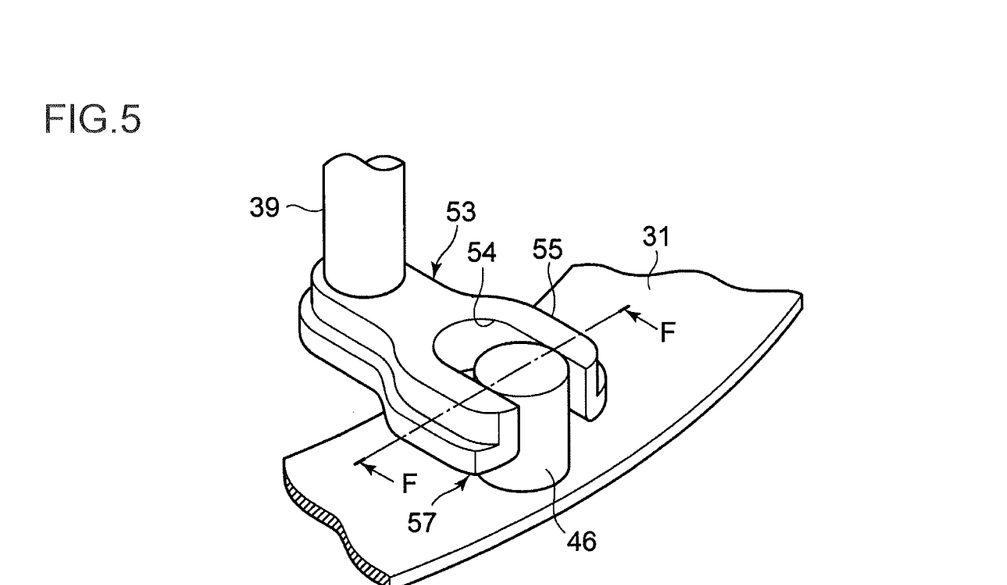
FIG. 5 is a first modified example of an engagement part of FIG. 4.
Figure 6:
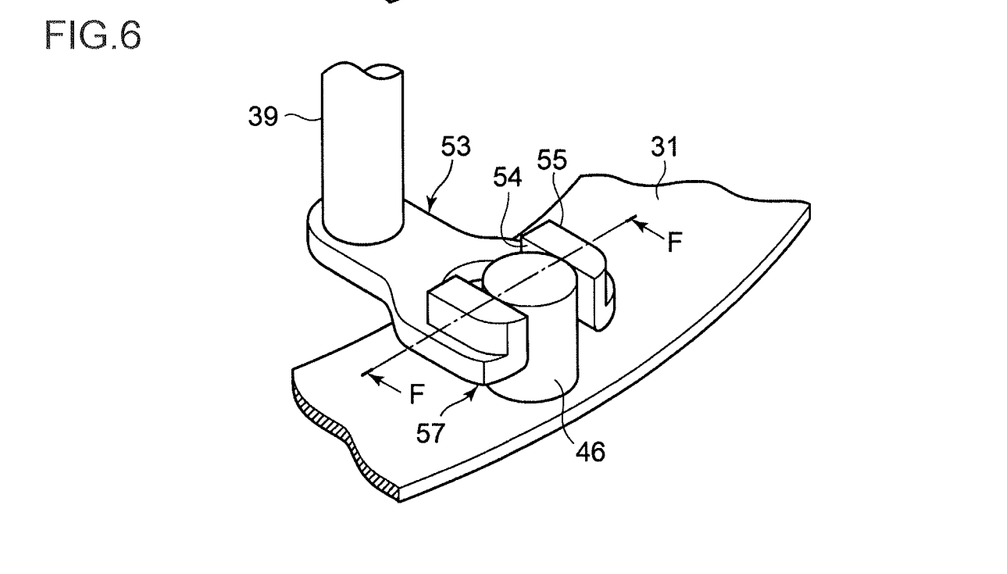
FIG. 6 is a second modified example of the engagement part of FIG. 4.

The output lever 41, as illustrated in FIG. 4, is constituted by a two-fork portion 43 and a pin insertion groove 45 formed there between. A side surface of the two-fork portion 43 forms a smooth surface 47 where an end face of a pin 46 projecting from the side surface of the drive ring 31 contacts during assembly.

Figure 3A:
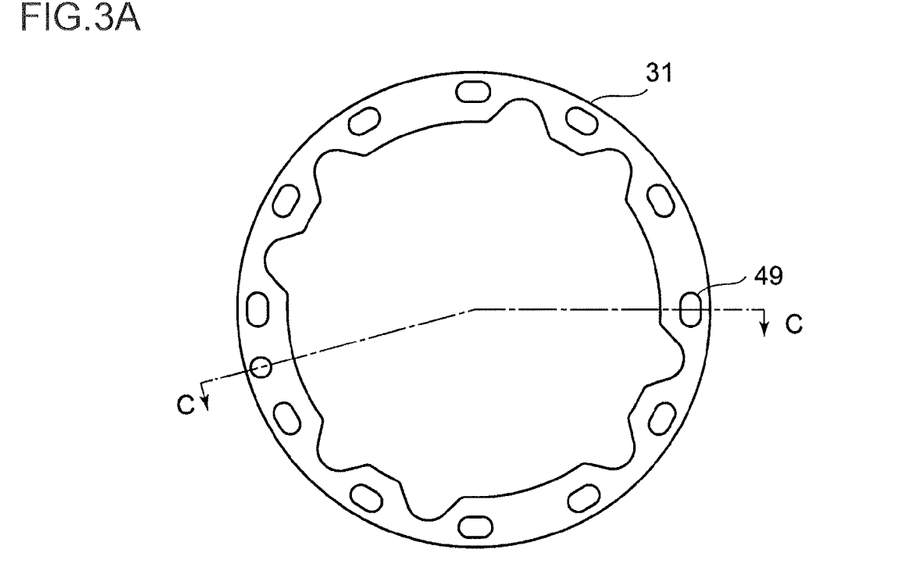
FIG. 3A is a front view of a drive ring according to the first embodiment.
Figure 3B:
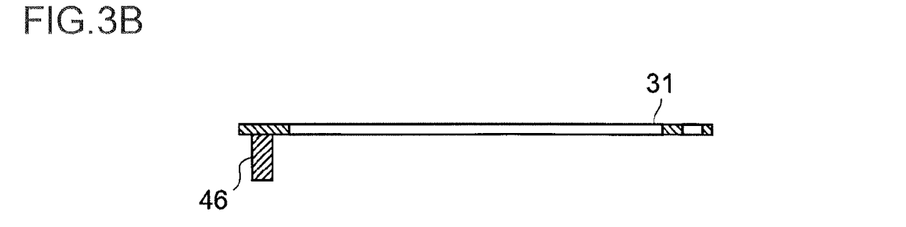
FIG. 3B is a cross-sectional view taken along line C-C of FIG. 3A.

FIG. 3A is a front view of the drive ring 31 showing a front shape of the drive ring 31. In the drive ring 31, oval fitting holes 49 are formed in the circumferential direction. To the oval fitting hole 49, one end of the lever plate 33 is attached.

Further, an engaging part 51 is formed by the two-fork portion 43, a pin insertion slot 45 formed on an inner side of the two-fork portion 43, and the pin 46. The engaging part 51 is configured to engage an output section of the link mechanism section 35 and an input section of the variable nozzle mechanism section 23 with each other using a pin 46.

The output lever 41, as illustrated in FIG. 4, is configured such that an end of the coupling lever 39 is connected to a root portion of the two-fork portion 43 and the pin insertion slot 45 formed between two forks of the two-fork portion 43 has a cut-out substantially oval shape. A short diameter part of the oval shape has such a width that the pin 46 is loosely fit therein. Further, a tip portion of each of two forks of the two-fork portion 43 is rounded to form a corner R (Ra).

By curved surface processing of this corner R (Ra), the engagement position between the two-fork portion 43 and the pin 46 to avoid contact of the corner of the tip of the two-fork portion 43 to the inner peripheral wall surface of the annular recess 17 is positioned at the outer periphery of the drive ring 31. Thus, stable rotation of the drive ring 31 can be achieved with a small rotational force of the output lever 41.

Further, an opening edge portion on the smooth surface 47 side of the two-fork portion 43 is rounded to form corner R (Rb) so as to facilitate insertion of the pin 46.

An output lever 53 illustrated in FIG. 5, FIG. 6, FIG. 7A and FIG. 7B is a modified example of the output lever 41 illustrated in FIG. 4.

As illustrated in FIG. 5, FIG. 6, FIG. 7A and FIG. 7B, the output lever 53 includes a two-fork portion 55 and an insertion slot 54. The cross-sectional shape of the two-fork portion 55 has a substantially L-shape, width d of a smooth surface 57 of the substantially L-shape (FIG. 7) is formed wider than the output lever 41 of the linear shape as illustrated in FIG. 4 the smooth surface 57 of the shape.

The other configuration is similar to the FIG. 4. In this modified example, the larger width d on the smooth surface 57 side is secured. Thus, it is possible to improve workability during assembly of the pin 46 due to the increased contact surface of the tip of the pin 46 and also achieve weight reduction of the overall weight of the output lever 53 by forming the section of the two-fork portion 55 contacting the pin 46 into substantially L-shape and reducing the thickness of other section compared to the lever of FIG. 4. As a result, it is possible to obtain load reduction effect of the sliding portion and the stable rotational operation of the output lever 53 during the operation.

The operation of the exhaust turbocharger 1 with the variable nozzle mechanism having the above configuration is as follows. The exhaust gas from the engine enters the scroll 5, flows around along a swirl of the scroll 5 and flows through the nozzle vanes 19a. Then, this exhaust gas passing between the nozzle vanes 19a flows into the turbine rotor 7 from the outer peripheral side, flows in the radial direction toward the center to perform expansion work to the turbine rotor 7 and then flows in the axial direction toward a gas outlet to be discharged to the outside.

To control displacement of the exhaust turbocharger 1 with the variable nozzle mechanism, a vane angle of the nozzle vane 19a is set to an angle that achieves a prescribed flow rate of the exhaust gas flowing through the nozzle vanes 19a, and the vane angle is changed by an vane angle regulating part (not shown). The reciprocal displacement of the actuator corresponding to this vane angle is transmitted to the drive ring 31 to rotate the drive ring 31. By rotation of the drive ring 31, the lever plate 33 rotates, thereby rotating the nozzle shaft 19b fixed to the other end of the lever plate 33. This rotation of the nozzle shaft 19b causes rotation of the nozzle vane 19a, thereby changing the vane angle.

The assembly process of assembling the variable nozzle mechanism section 23 to the recess 17 formed on the rear surface 15 of the bearing housing 13 is now explained.

First, the link mechanism section 35 is assembled to the bearing housing 13 side to prepare the bearing housing 13 assembled with this link mechanism section 35, and then the variable nozzle mechanism section 23 is assembled to the bearing housing 13 in such a manner that the variable nozzle mechanism section 23 overlaps the recess 17 of the bearing housing 13. In this step, the pin 46 constituting the engaging part 51 is roughly positioned so that the pin 46 is placed to the smooth surface 47 (57) of the two-fork portion 43 (55) of the output lever 41 (53).

Figure 7A:
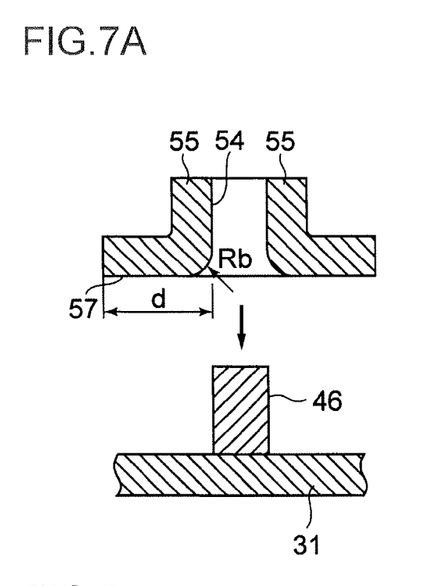
FIG. 7 is an explanatory view illustrating an assembling state at the engagement part of FIG. 4.
Figure 7B:
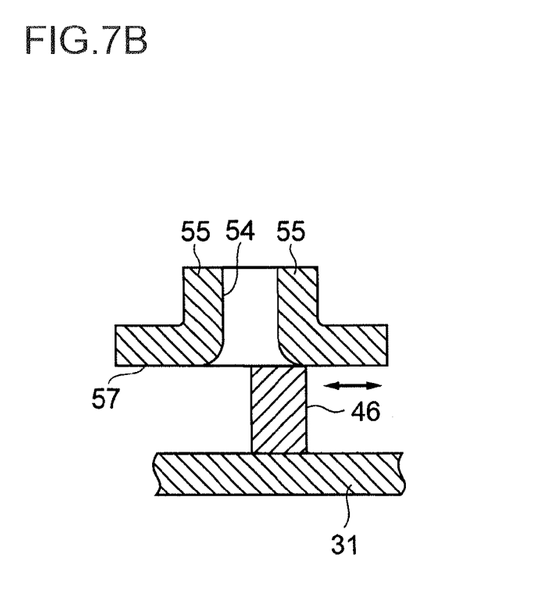

Then, the tip portion of the pin 46 is moved along the smooth surface 47 (57) so as to position the tip position of the pin 46 at the pin insertion position while moving (see FIG. 7B).

The peripheral edge portion of the oval opening on the smooth surface 47 (57) side is rounded into corner R (Rb) (approximately to R2 to R3) to facilitate insertion of the pin 46, and the pin 46 is moved along the smooth surface 47 (57) while pressing lightly. Thus, as movement of the pin 46 along the smooth surface 47 stops at the insertion position, it can be determined that the pin is at the insertion position.

Then, the pin 46 is pressed further to insert the pin 46 into the pin insertion slot 45 (54).

Next, it is positioned so that the outer peripheral part of the nozzle mount 21 fits the distal end of the recess 17 of the bearing housing 13, and the outer peripheral part of the nozzle mount 21 is sandwiched between the tip portion of the recess 17 and the stepped tip portion of the cylindrical opening part of the turbine housing 3 and fixed by a bolt 59. When sandwiching the outer peripheral part of the nozzle mount 21 between the bearing housing 13 and the turbine housing 3, the nozzle plate 27 is fitted to the distal end side of the inner cylinder of the turbine housing 3.

According to the above assembly method, when assembling the variable nozzle mechanism section 23 to the bearing housing 13, the pin 46 of the engaging part 51 is placed against the smooth surface 47 of the opposing output lever 41, and then position the pin 46 at the insertion slot 45 while moving the tip portion of the pin 46 along the smooth surface 47. When the movement of the pin 46 along the smooth surface 47 stops, it can be easily determined that the pin 46 is at the insertion position. As a result, positioning of the pin 46 and the insertion position for the pin 46 is facilitated.

Further, the pin 46 and the insertion slot 45 can be pushed relative to each other from the bearing housing 13 side or from the variable mechanism section 23 side.

As the engaging part 51 is arranged on an inner peripheral side of the recess 17 of the bearing housing 13, it is possible to reliably and easily perform the assembly even under poor visibility of the insertion position and the tip of the pin 46 due to the shadow of a longitudinal wall 17a of the recess 17.

As a result, there hardly occurs assembly defect and the quality stability of the variable displacement turbocharger 1 is improved.

(Second Embodiment)

A second embodiment of the present invention is described with reference to FIG. 8.

In the second embodiment, an engagement part 60 is configured such that the arrangement relation of the pin 46 and the pin insertion slot 45 (54) that constitute the engagement part 51 of the first embodiment is reversed.

Figure 8:
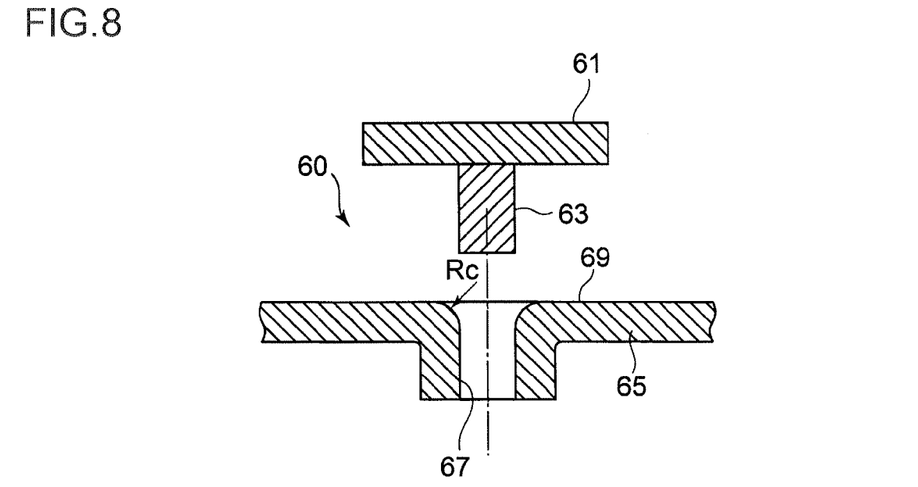
FIG. 8 is a cross-sectional explanatory view illustrating a second embodiment.

As illustrated in FIG. 8, a pin 63 is formed at an end of an output lever 61, and an insertion slot 67 or an insertion hole is formed in a side wall surface of the outer peripheral side of the drive ring 65 at a position opposing the pin 63. This insertion slot 67 or insertion hole is formed by cutting and raising the side wall surface from the pin contact surface side to the opposite side. The corner of this cut and raised portion is rounded to form corner R (Rc) (approximately to R2 to R3).

Further, a smooth surface 69 is formed around the insertion slot 67 or the insertion hole of the pin 63 so as to guide a tip portion of the pin 63 to the insertion position. Specifically, the side surface of the drive ring 65 around the insertion slot 67 or the insertion hole forms the smooth surface 69.

In the second embodiment, as in the first embodiment, when assembling the variable nozzle mechanism section 23 to the bearing housing 13, the pin 63 of the engaging part 60 is placed against the smooth surface 69, and then the pin 63 is positioned at the insertion slot 67 while moving the tip portion of the pin 63 along the smooth surface 69. Thus, when the movement of the pin 63 along the smooth surface 69 stops, it can be easily determined that the pin 63 is at the insertion position. As a result, positioning of the pin 63 and the insertion position for the pin 63 is facilitated.

In the above first embodiment and second embodiment, the peripheral edge portion of the insertion slot or insertion hole for the pin is rounded to facilitate insertion of the pin. This is, however, not restrictive and the tip portion of the pin 46, 63 may be rounded as well.

INDUSTRIAL APPLICABILITY

According to the present invention, it is possible to achieve easy and reliable coupling operation of a variable nozzle mechanism with a link mechanism for transmitting a drive from an external actuator when the variable nozzle mechanism assembly is formed and the variable nozzle mechanism assembly is assembled to a housing such as a bearing housing, and thus it is suitable for use in a variable displacement turbocharger.

The invention claimed is:

1. A variable displacement turbocharger comprising:
a turbine housing into which exhaust gas from an internal combustion engine is introduced;
a turbine rotor which is provided in the turbine housing and is configured to be rotated by the exhaust gas;
a turbine shaft having one end inserted in the turbine housing, and the turbine rotor being attached to the end;
a bearing which is configured to support the turbine shaft;
a bearing housing which houses the bearing and is formed with a cylindrical wall part protruding in an axial direction toward a turbine housing side from an outer peripheral part of a rear surface of the bearing housing, the rear surface extending in a radial direction;
a variable nozzle mechanism which is assembled and housed in an annular recess formed radially inside the cylindrical wall part of the bearing housing on the rear surface of the bearing housing and is configured to regulate a flow of the exhaust gas to the turbine rotor;
a link mechanism which is configured to convert reciprocal displacement from an actuator that operates the variable nozzle mechanism into rotational displacement and transmit the rotational displacement to an inner section of the annular recess of the bearing housing, the link mechanism extending through the rear surface; and
an engaging part which is configured to engage an output section of the link mechanism and art input section of the variable nozzle mechanism,
wherein the engaging part is constituted by a pin insertion part which comprises a pin and a pin insertion hole or a pin insertion slot into which the pin is inserted, and a smooth surface is formed around an insertion position of the pin so as to guide a tip of the pin to the insertion position,
wherein the pin projects from a side surface of the drive ring on an outer peripheral side of the drive ring constituting the variable nozzle mechanism, and the pin insertion part comprises a two-fork portion formed at an end of an output lever constituting the link mechanism and the insertion slot formed on an inner side of the two-fork portion, the pin insertion part having the, smooth surface on a side face of the two-fork portion,
wherein a cross-sectional shape of the two-fork portion has an L-shape and the two-fork portion is configured to engage with the pin such that a left tip and a right tip of the two-fork portion face an inner wall surface of the cylindrical wall part of the bearing housing from radially inside on the rear surface, a corner of each of the left tip and the right tip of the two-fork portion is rounded to avoid contact with the inner wall surface of the cylindrical wall part at rotation.

2. The variable displacement turbocharger, according to claim 1, wherein a peripheral edge portion of the pin insertion hole or the pin insertion slot of the pin insertion part is rounded to facilitate insertion of the pin.

3. An assembly method for assembling a variable displacement turbocharger comprising:
preparing the variable displacement turbocharger including,
a turbine housing into which exhaust gas from an internal combustion engine is introduced;
a turbine rotor which provided in the turbine housing and is configured to be rotated by the exhaust gas;
a turbine shaft having one end inserted in the turbine housing, and the turbine rotor being attached to the end;
a bearing which is configured to support the turbine shaft;
a bearing housing which houses the bearing and is formed with a cylindrical wall part protruding in an axial direction toward a turbine housing side from an outer peripheral part of a rear surface of the bearing housing, the rear surface extending in a radial direction;
a variable nozzle mechanism which is assembled and housed in an annular recess formed radially inside the cylindrical wall part of the bearing housing on the rear surface of the bearing housing and is configured to regulate a flow of the exhaust gas to the turbine rotor;
a link mechanism which is configured to convert reciprocal displacement from an actuator that operates the variable nozzle mechanism into rotational displacement and transmit the rotational displacement to an inner section of the annular recess of the bearing housing, the link mechanism extending through the rear surface; and
an engaging part which is configured to engage an output section of the link mechanism and an input section of the variable nozzle mechanism,
wherein the engaging part is constituted by a pin insertion part which comprises a pin and a pin insertion hole or a pin insertion slot into which the pin is inserted, and a smooth surface is formed around an insertion position of the pin so as to guide a tip of the pin to the insertion position,
wherein the pin projects from a side surface of the drive ring on an outer peripheral side of the drive ring constituting the variable nozzle mechanism, and the pin insertion part comprises a two-fork portion formed at an end of an output lever constituting the link mechanism and the insertion slot formed on an inner side of the two-fork portion, the pin insertion part having the smooth surface on a side face of the two-fork portion, and
wherein a cross-sectional shape of the two-fork portion has an L-shape and the two-fork portion is configured to engage with the pin such that a left tip and a right tip of the two-fork portion face an inner wall surface of the cylindrical wall part of the bearing housing from radially inside the rear surface, a corner of each of the left tip and the right tip of the two-fork portion is rounded to avoid contact with the inner wall surface of the cylindrical wall part at rotation;
preparing the bearing housing to which the link mechanism is assembled; and
assembling the variable nozzle mechanism to the bearing housing,
wherein the assembling step comprises the substeps of:
placing the pin of the engaging part against the smooth surface;
moving a tip portion of the pin along the smooth surface so as to position the tip portion in the insertion position; and then
pushing the variable nozzle mechanism toward the bearing housing.

4. An assembly method for assembling a variable displacement turbocharger, comprising:
preparing the variable displacement turbocharger including,
a turbine housing into which exhaust gas from an internal combustion engine is introduced;
a turbine rotor which is provided in the turbine housing and is configured to be rotated by the exhaust gas;
a turbine shaft having one end inserted in the turbine housing, and the turbine rotor being attached to the end;
a bearing which is configured to support the turbine shaft;
a bearing housing which houses the bearing and is formed with a cylindrical wall part protruding in an axial direction toward a turbine housing side from an outer peripheral part of a rear surface of the bearing housing, the rear surface extending in a radial direction;
a variable nozzle mechanism which is assembled and housed in an annular recess formed radially inside the cylindrical wall part of the bearing housing on the rear surface of the bearing housing and is configured to regulate a flow of the exhaust gas to the turbine rotor;
a link mechanism which is configured to convert reciprocal displacement from an actuator that operates the variable nozzle mechanism into rotational displacement and transmit the rotational displacement to an inner section of the annular recess of the bearing housing, the link mechanism extending through the rear surface; and
an engaging part which is configured to engage an output section of the link mechanism and an input section of the variable nozzle mechanism,
wherein the engaging part is constituted by a pin insertion part which comprises a pin and a pin insertion hole or a pin insertion slot into which the pin is inserted, and a smooth surface is formed around an insertion position of the pin so as to guide a tip of the pin to the insertion position,
wherein the pin projects from a side surface of the drive ring on an outer peripheral side of the drive ring constituting the variable nozzle mechanism, and the pin insertion part comprises a two-fork portion formed at an end of an output lever constituting the link mechanism and the insertion slot formed on an inner side of the two-fork portion, the pin insertion part having the smooth surface on a side face of the two-fork portion,
wherein a cross-sectional shape of the two-fork portion has an L-shape and the two-fork portion is configured to engage with the pin such that a left tip and a right tip of the two-fork portion face an inner wall surface of the cylindrical wall part of the bearing housing from radially inside on the rear surface, a corner of each of the left tip and the right tip of the two-fork portion is rounded to avoid contact with the inner wall surface of the cylindrical wall part at rotation, and
wherein a peripheral edge portion of the pin insertion hole or the pin insertion slot of the pin insertion part is rounded to facilitate insertion of the pin;
preparing the bearing housing to which the link mechanism is assembled; and
assembling the variable nozzle mechanism to the bearing housing,
wherein the assembling step comprises the substeps of:
placing the pin of the engaging part against the smooth surface;
moving a tip portion of the pin along the smooth surface so as to position the tip portion in the insertion position; and then
pushing the variable nozzle mechanism toward the bearing housing.

* * * * *